US012667940B2

(12) United States Patent
Lee

(10) Patent No.: US 12,667,940 B2
(45) Date of Patent: Jun. 30, 2026

(54) ENGAGING STRUCTURE FOR HAND TOOL

(71) Applicant: Tsan-Chang Lee, Taichung City (TW)

(72) Inventor: Tsan-Chang Lee, Taichung City (TW)

( * ) Notice: Subject to any disclaimer, the term of this patent is extended or adjusted under 35 U.S.C. 154(b) by 343 days.

(21) Appl. No.: 18/514,138

(22) Filed: Nov. 20, 2023

(65) Prior Publication Data

US 2025/0162109 A1 May 22, 2025

(51) Int. Cl.
*B25B 13/08* (2006.01)
*B25B 13/06* (2006.01)

(52) U.S. Cl.
CPC ............ *B25B 13/08* (2013.01); *B25B 13/065* (2013.01)

(58) Field of Classification Search
CPC ....... B25B 13/02; B25B 13/04; B25B 13/065; B25B 13/06; B25B 13/08; B25B 13/46; B25B 13/48; B25B 23/0035; B25B 23/0071; B25B 23/02; B25B 23/105; B25B 23/142; B25B 27/02; B25B 27/14
See application file for complete search history.

(56) References Cited

U.S. PATENT DOCUMENTS 4,512,220 A * 4/1985 Barnhill, III .......... B25B 13/065 81/121.1
5,388,486 A * 2/1995 Ruzicka .................. B25B 13/04 81/124.3
5,832,792 A * 11/1998 Hsieh .................... B25B 13/065 81/124.6
5,996,449 A * 12/1999 Hsieh ...................... B25B 13/08 81/186
6,354,175 B1 * 3/2002 Dobson ................... B25B 13/04 81/186
9,718,170 B2 * 8/2017 Eggert .................. B25B 13/065
11,806,843 B2 * 11/2023 Eggert .................. B25B 13/065
2015/0027278 A1 * 1/2015 Lee ......................... B25B 23/00 81/119
2022/0226969 A1 * 7/2022 Lee ......................... B25B 13/04
2024/0408727 A1 * 12/2024 Liao ...................... B25B 23/105

FOREIGN PATENT DOCUMENTS

TW M491555 U * 12/2014

* cited by examiner

*Primary Examiner* — Monica S Carter
*Assistant Examiner* — Kent N Shum
(74) *Attorney, Agent, or Firm* — LANWAY IPR SERVICES; Chun-Ming Shih

(57) ABSTRACT

An engaging structure includes a main body having a first side, a second side, a third side, and a fourth side. The first side is provided with a first face and a first recess. A vertical line passes the first face. The first recess is provided with a first arcuate face and a second arcuate face. The second side is provided with a second recess, a second face, and a third recess. The second recess is situated at a left side of the vertical line which passes the second face. The fourth side is provided with a fourth recess that is close to the third recess. A first angle is defined between the first side and the third side. A second angle is defined between the second side and the fourth side. A fifth recess is defined between the third side and the fourth side.

4 Claims, 7 Drawing Sheets

ENGAGING STRUCTURE FOR HAND TOOL

BACKGROUND OF THE INVENTION

Field of the Invention

The present invention relates to a hand tool and, more particularly, to an engaging structure of a hand tool, such as a wrench or the like, that is used to operate a workpiece, such as a screw or the like.

Description of the Related Art

A conventional socket structure was disclosed in the U.S. Publication No. 20060117917, and comprises a socket 20 provided with an engaging hole 22 including multiple grooves 23 and multiple stop ribs 24. When the engaging hole 22 of the socket 20 is mounted on a screw head 40, the stop ribs 24 are locked on the screw head 40 to drive and rotate the screw head 40.

However, such a conventional socket structure has the following disadvantages.

1. The stop ribs 24 engage the six sides of the screw head 40, but each of the stop ribs 24 has a sharp pointed shape so that when the screw head 40 is driven by the socket 20, the stop ribs 24 of the socket 20 easily wear and cause bite marks on the six sides of the screw head 40.

2. Each of the stop ribs 24 has a sharp pointed shape so that the stop ribs 24 only have six lines contacting with the six sides of the screw head 40, thereby decreasing the rotational torque of the stop ribs 24 applied on the screw head 40.

BRIEF SUMMARY OF THE INVENTION

The primary objective of the present invention is to provide an engaging structure that will not wear a workpiece easily.

In accordance with the present invention, there is provided an engaging structure comprising a main body. The main body includes a first side, a second side, a third side, and a fourth side. The first side is provided with a first face and a first recess. A vertical line passes the first face. The first recess is provided with a first arcuate face and a second arcuate face. The second side is provided with a second recess, a second face, and a third recess. The second recess is situated at a left side of the vertical line. The vertical line passes the second face. The fourth side is provided with a fourth recess. The fourth recess is close to the third recess. A first angle is defined between the first side and the third side. A second angle is defined between the second side and the fourth side. A fifth recess is defined between the third side and the fourth side.

According to the primary advantages of the present invention, when the main body is rotated clockwise to drive the screw member, the first face of the main body serves as the primary driving portion to drive and rotate one of the faces of the screw member. The first face of the main body has a larger area and provides a better rotational torque to rotate the screw member so that the first face of the main body will not form a bite mark on the faces of the screw member.

According to another advantage of the present invention, when the main body is rotated clockwise to drive the screw member, the first recess, the second recess, the third recess, and the fifth recess align with four of the six sharp corners of the screw member to prevent the sharp corners of the screw member from being worn out. In such a manner, when the main body drives and rotates the screw member, the main body will not cause a bite mark on the six faces of the screw member and will not wear the six sharp corners of the screw member.

According to a further advantage of the present invention, when the main body is rotated counterclockwise to unscrew and loosen the screw member, the first face, the second face, the intersection point, and the fourth side press four of the six faces of the screw member. The second face of the main body serves as the primary driving portion, while the first face, the intersection point, and the fourth side serve as the secondary driving portion. Thus, the main body has two faces and two points contacting the screw member to facilitate the main body driving the screw member.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
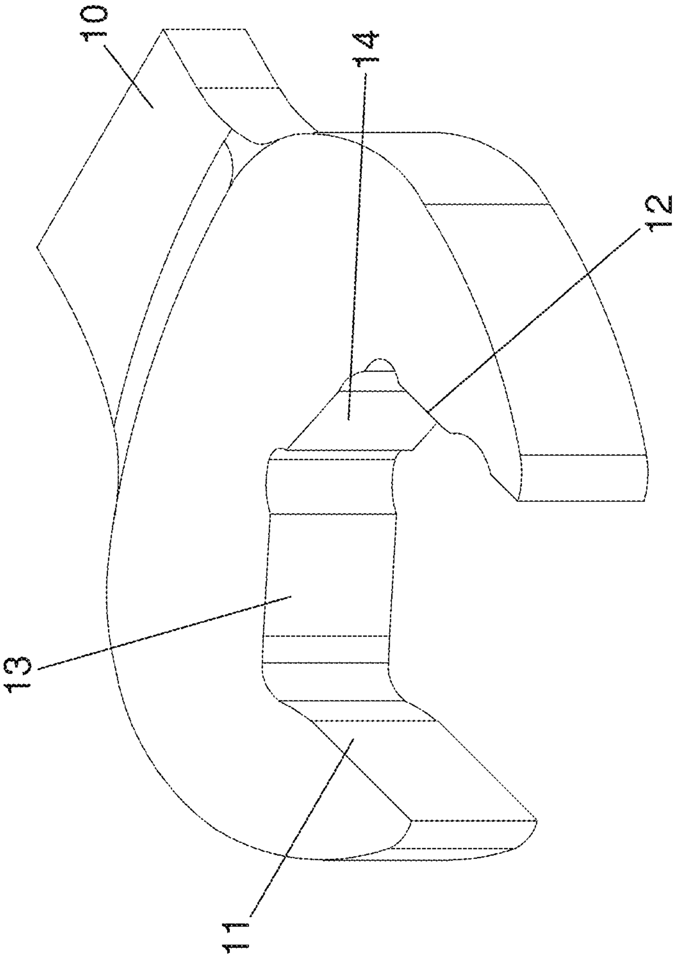
FIG. 1 is a perspective view of an engaging structure in accordance with the preferred embodiment of the present invention.
Figure 2:
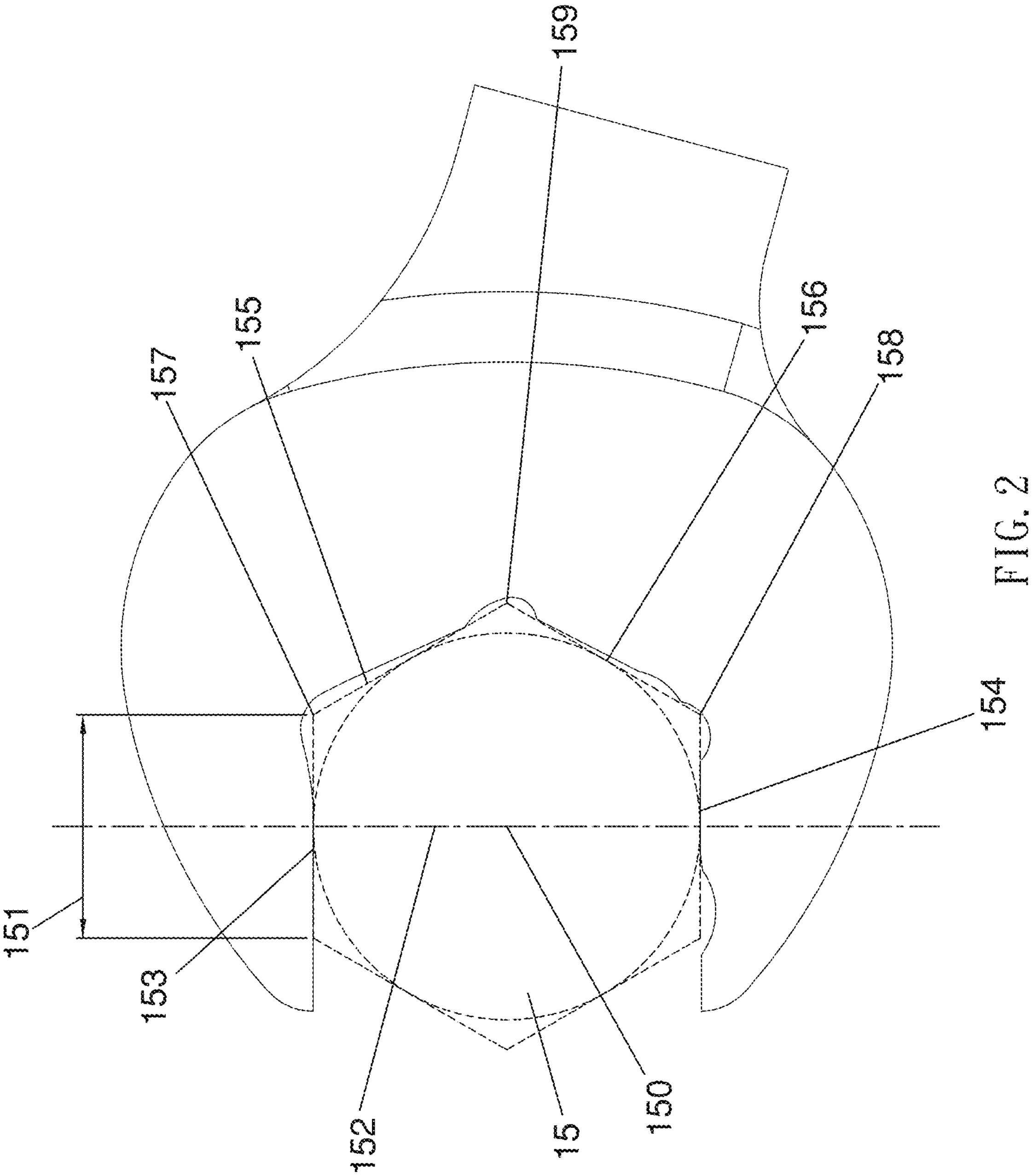
FIG. 2 is a schematic planar view of the engaging structure in accordance with the preferred embodiment of the present invention.
Figure 3:
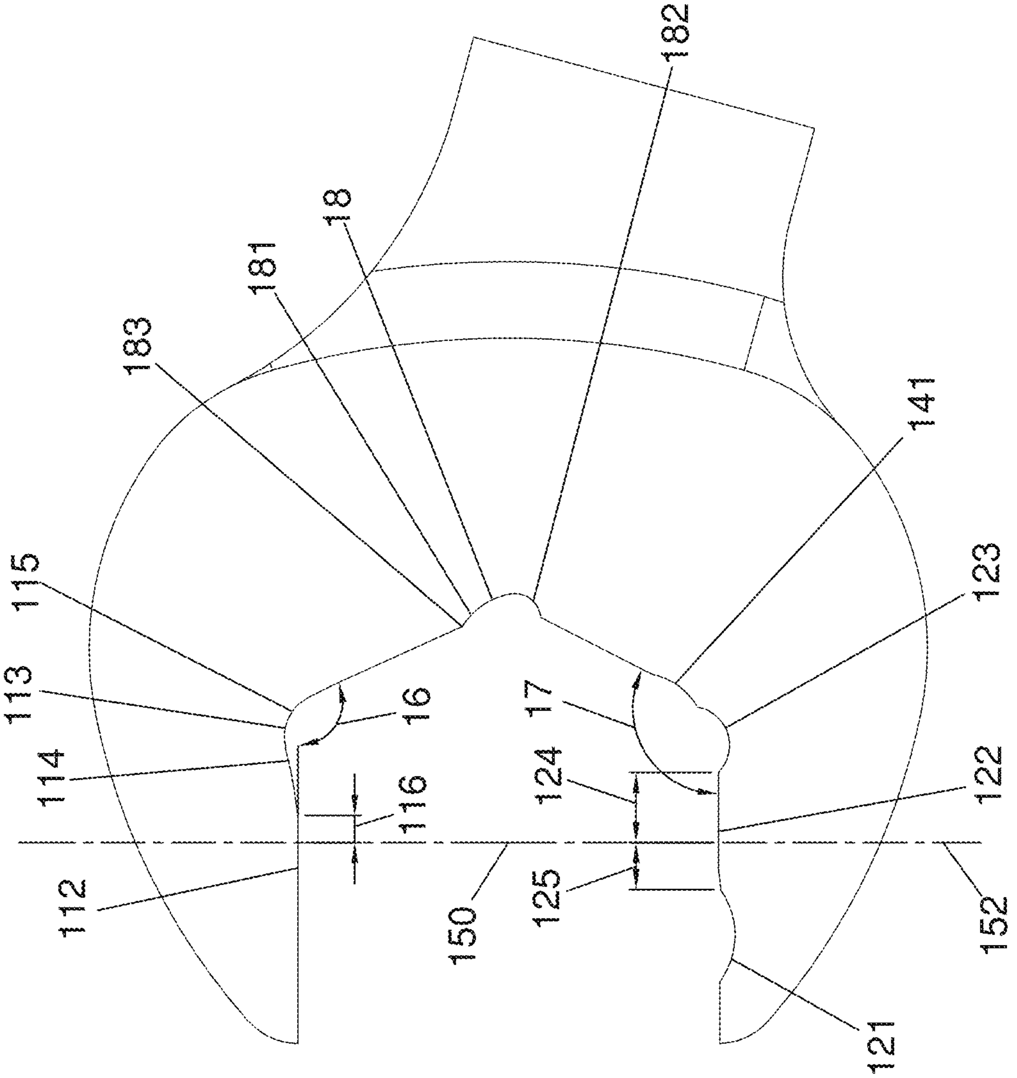
FIG. 3 is a top view of the engaging structure as shown in FIG. 1.

Referring to the drawings and initially to FIGS. 1-3, an engaging structure (or an operating structure or a driving structure) for a hand tool in accordance with the preferred embodiment of the present invention comprises a main body 10. The main body 10 is an open wrench or an engaging portion of a hand tool. The main body 10 includes a first side 11, a second side 12, a third side 13, and a fourth side 14. The first side 11 is opposite to the second side 12. The first side 11, the third side 13, the fourth side 14, and the second side 12 are arranged serially and annularly.

The first side 11, the third side 13, the fourth side 14, and the second side 12 construct a hexagon 15. The hexagon 15 is an equilateral hexagon. The hexagon 15 has an axis 150. The hexagon 15 has six sides each of which has a first length 151. A vertical line 152 passes the axis 150 in a two-dimensional plane. The hexagon 15 has a first line 153, a second line 154, a third line 155, a fourth line 156, a first angled corner 157, a second angled corner 158, and a third angled corner 159. Each of the first line 153, the second line 154, the third line 155, and the fourth line 156 has a length equal to the first length 151. The first line 153 aligns with the first side 11, the second line 154 aligns with the second side 12, the third line 155 aligns with the third side 13, and the fourth line 156 aligns with the fourth side 14. The first line 153 coincides with a partial line segment of the first side 11. The second line 154 coincides with a partial line segment of the second side 12. The third line 155 coincides with the third side 13 at one point. The fourth line 156 coincides with the fourth side 14 at one point.

The first side 11 is provided with a first face 112 and a first recess 113. The vertical line 152 passes the first face 112. The first face 112 has a planar shape. The first face 112 is arranged asymmetrically relative to the vertical line 152. The first face 112 extends to an opening of the main body 10. The first recess 113 is situated at a right side of the vertical line 152. The first recess 113 connects the third side 13. The first recess 113 is provided with a first arcuate face 114 and a second arcuate face 115. The first arcuate face 114 connects the first face 112. The first arcuate face 114 is tangent to the first face 112. The first arcuate face 114 is tangent to the second arcuate face 115. The second arcuate face 115 connects the third side 13.

The first arcuate face 114 has a radius having an integer value equal to that of a distance between the first line 153 and the second line 154. Thus, if the integer value of the distance between the first line 153 and the second line 154 is 19 mm, the integer value of the radius of the first arcuate face 114 is also 19 mm, and if the integer value of the distance between the first line 153 and the second line 154 is 18 mm, the integer value of the radius of the first arcuate face 114 is also 18 mm. The radius of the first arcuate face 114 is more than that of the second arcuate face 115. The radius of the first arcuate face 114 is seven times to nine times that of the second arcuate face 115. The radius of the first arcuate face 114 is eight times that of the second arcuate face 115.

A first distance 116 is defined between a right end point of the first face 112 and the vertical line 152. The first length 151 is seven times to fifteen times the first distance 116. The first length 151 is eight times to ten times the first distance 116. The first length 151 is about nine times the first distance 116.

The second side 12 is provided with a second recess 121, a second face 122, and a third recess 123. The second recess 121 is situated at a left side of the vertical line 152. The second recess 121 is a single arcuate face. The vertical line 152 passes the second face 122. The second face 122 faces the first face 112. The second face 122 has a planar shape. The second face 122 is arranged asymmetrically relative to the vertical line 152. The third recess 123 connects the fourth side 14. The second face 122 is arranged between the second recess 121 and the third recess 123. The third recess 123 is a single arcuate face. The third recess 123 is not tangent to the second face 122. The second recess 121 has a radian (or radius) more than that of the third recess 123.

A second distance 124 is defined between a right end point of the second face 122 and the vertical line 152. The second distance 124 aligns with the first distance 116. A third distance 125 is defined between a left end point of the second face 122 and the vertical line 152. The second distance 124 is more than the third distance 125. The second distance 124 is at least 1.3 times the third distance 125. The third distance 125 is more than the first distance 116. The second distance 124 is at least two times the first distance 116.

The fourth side 14 is provided with a fourth recess 141. The fourth recess 141 is close to the third recess 123. The fourth recess 141 is a single arcuate face. The second recess 121 has a radian (or radius) more than that of the fourth recess 141. The fourth recess 141 has a radian (or radius) more than that of the third recess 123.

A first angle 16 is defined between the first side 11 and the third side 13. The first angle 16 is less than 115 degrees or 120 degrees. A second angle 17 is defined between the second side 12 and the fourth side 14. The second angle 17 is less than 120 degrees. The second angle 17 is slightly more than the first angle 16.

A fifth recess 18 is defined between the third side 13 and the fourth side 14. The fifth recess 18 is arranged at a connection of the third side 13 and the fourth side 14. The fifth recess 18 includes a third arcuate face 181, a fourth arcuate face 182, and an intersection point 183. The third arcuate face 181 connects the third side 13. The fourth arcuate face 182 connects the fourth side 14. The third arcuate face 181 is larger than the fourth arcuate face 182. The intersection point 183 is arranged at a connection of the third arcuate face 181 and the third side 13.

Figure 4:
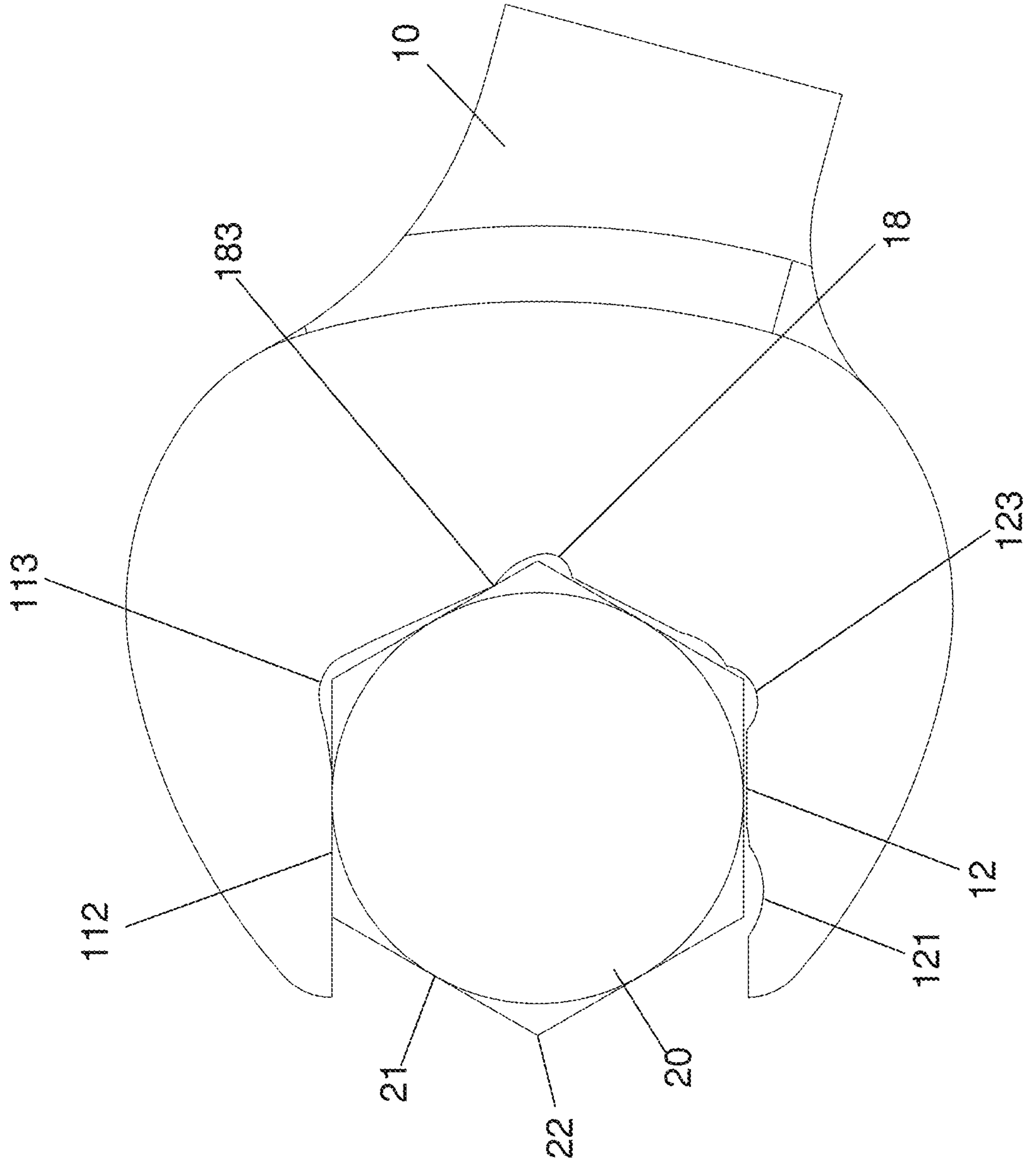
FIG. 4 is an operational view of the engaging structure as shown in FIG. 3.

In operation, referring to FIG. 4 with reference to FIGS. 1-3, the main body 10 is used to operate a screw member 20 having six faces 21 and six sharp (or pointed) corners 22. The main body 10 is rotated clockwise to screw and tighten the screw member 20. The first face 112, the second face 122, and the intersection point 183 press three of the six faces 21 of the screw member 20. At this time, the first face 112 of the main body 10 serves as the primary driving portion. When the main body 10 is rotated to drive the screw member 20, the first face 112 of the main body 10 drives and rotates one of the faces 21 of the screw member 20. Thus, the first face 112 of the main body 10 has a rotational torque and will not cause a bite mark on the faces 21 of the screw member 20. The first recess 113, the second recess 121, the third recess 123, and the fifth recess 18 align with and receive four of the six sharp corners 22 of the screw member 20 to prevent the sharp corners 22 of the screw member 20 from being worn out. In such a manner, when the main body 10 drives and rotates the screw member 20, the main body 10 will not cause a bite mark on the six faces 21 of the screw member 20 and will not wear the six sharp corners 22 of the screw member 20.

It is noted that, the first angle 16 is less than 115 degrees or 120 degrees, so that when the first face 112 of the main body 10 drives and rotates one of the faces 21 of the screw member 20, only the intersection point 183 of the third side 13 will press another one of the faces 21 of the screw member 20. In addition, the second angle 17 is less than 120 degrees so that the fourth side 14 will not press one of the faces 21 of the screw member 20.

Figure 5:
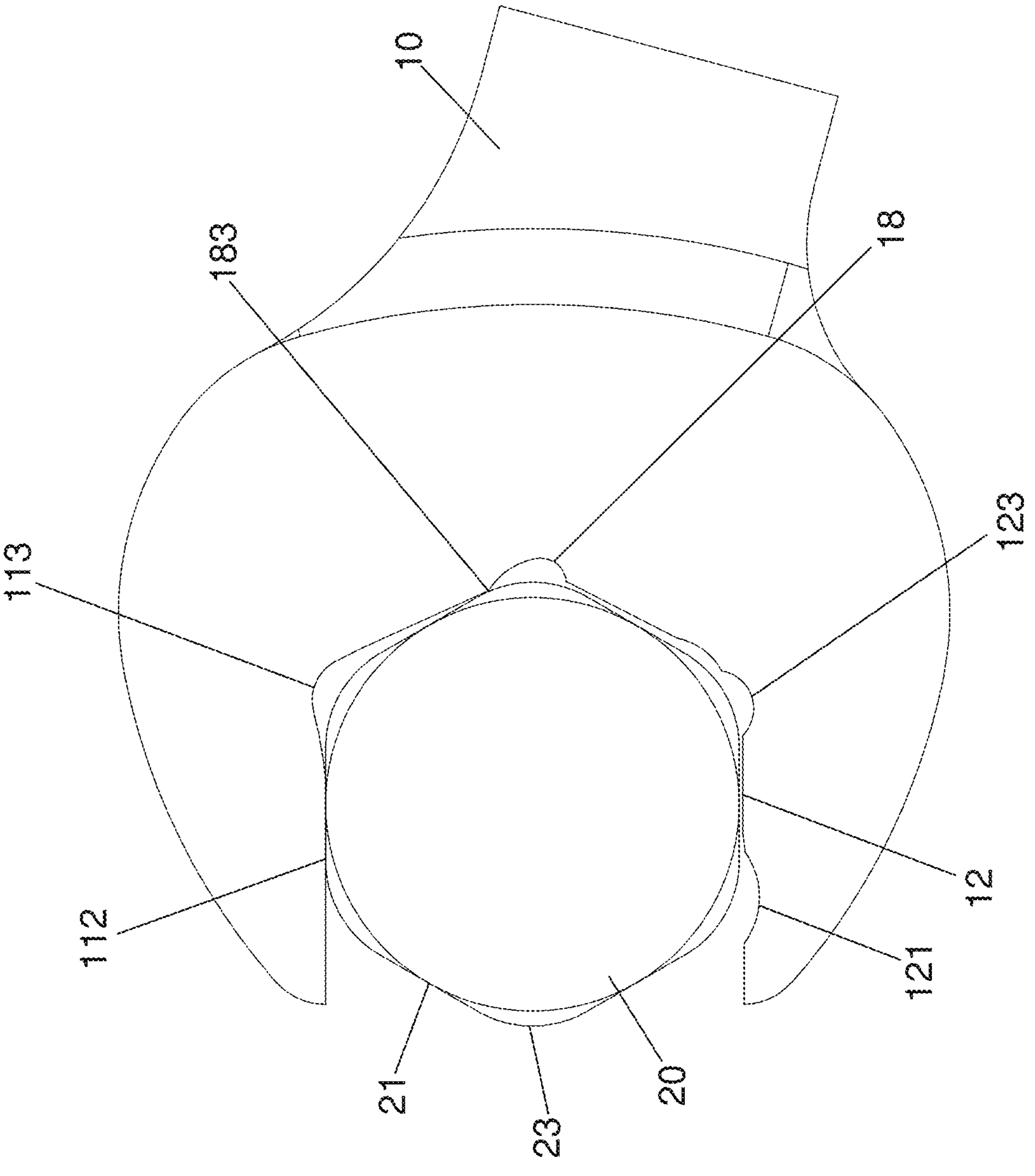
FIG. 5 is another operational view of the engaging structure as shown in FIG. 3.
Figure 6:
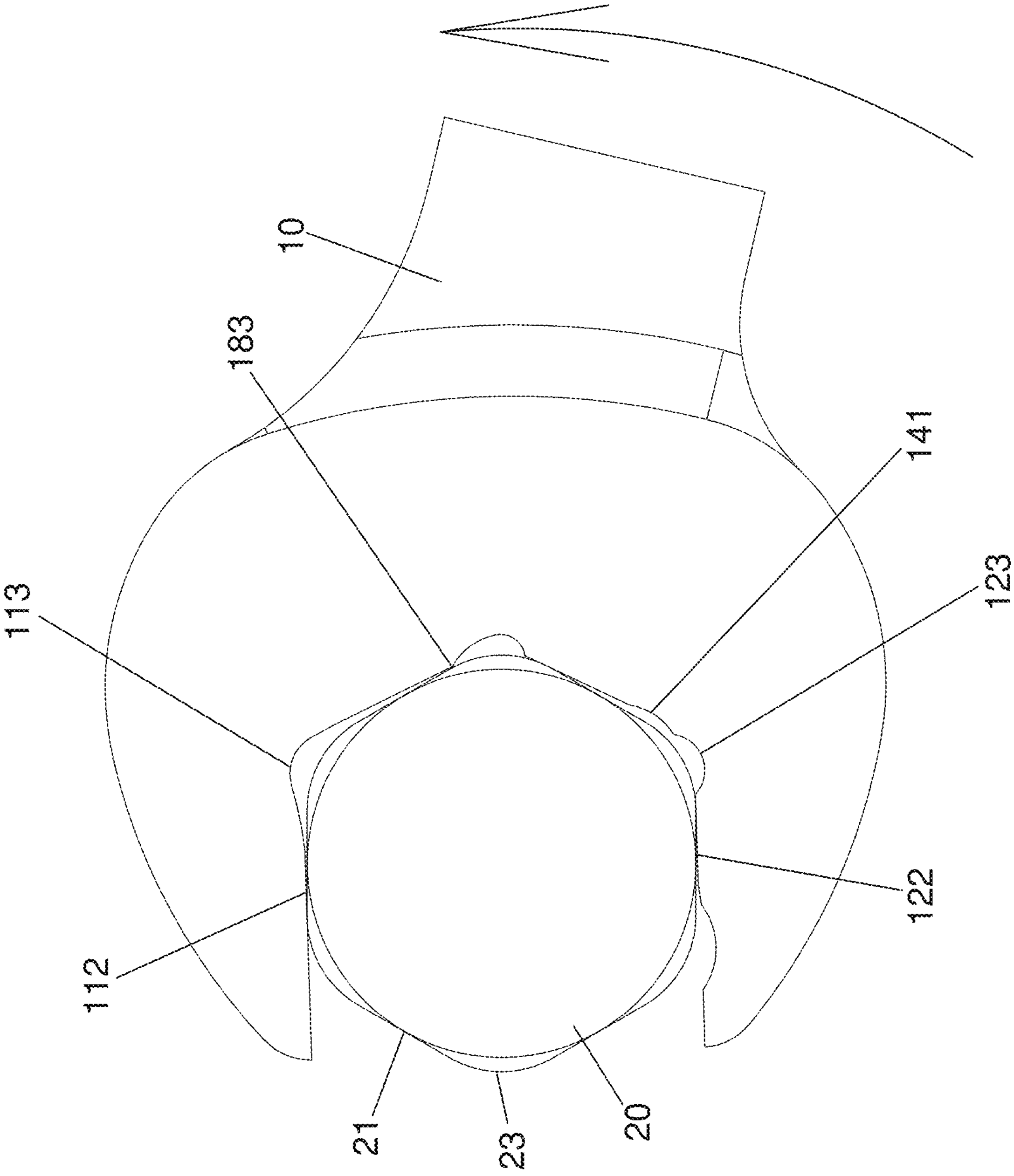
FIG. 6 is an operational view of the engaging structure as shown in FIG. 5.

Referring to FIGS. 5 and 6 with reference to FIGS. 1-3, each of the sharp corners 22 of the screw member 20 is worn into a round corner 23 as shown in FIG. 5. When the main body 10 is rotated counterclockwise to unscrew and loosen the screw member 20 as shown in FIG. 6, the first face 112, the second face 122, the intersection point 183, and the fourth side 14 press four of the six faces 21 of the screw member 20. At this time, the second face 122 of the main body 10 serves as the primary driving portion, while the first face 112, the intersection point 183, and the fourth side 14 serve as the secondary driving portion. Thus, when the main body 10 is rotated to drive the screw member 20, the second face 122 of the main body 10 drives and rotates one of the faces 21 of the screw member 20, to rotate and unscrew the screw member 20.

It is noted that, when the main body 10 is rotated relative to the screw member 20, the fourth side 14 of the main body 10 only contacts one of the faces 21 of the screw member 20 at one point.

It is further noted that, the second angle 17 is less than 120 degrees so that when the second face 122 of the main body 10 drives and rotates one of the faces 21 of the screw member 20, the fourth side 14 presses another one of the faces 21 of the screw member 20. In addition, the first angle 16 is less than 115 degrees or 120 degrees, so that when the second face 122 of the main body 10 drives and rotates one of the faces 21 of the screw member 20, only the intersection point 183 of the third side 13 will press another one of the faces 21 of the screw member 20.

Figure 7:
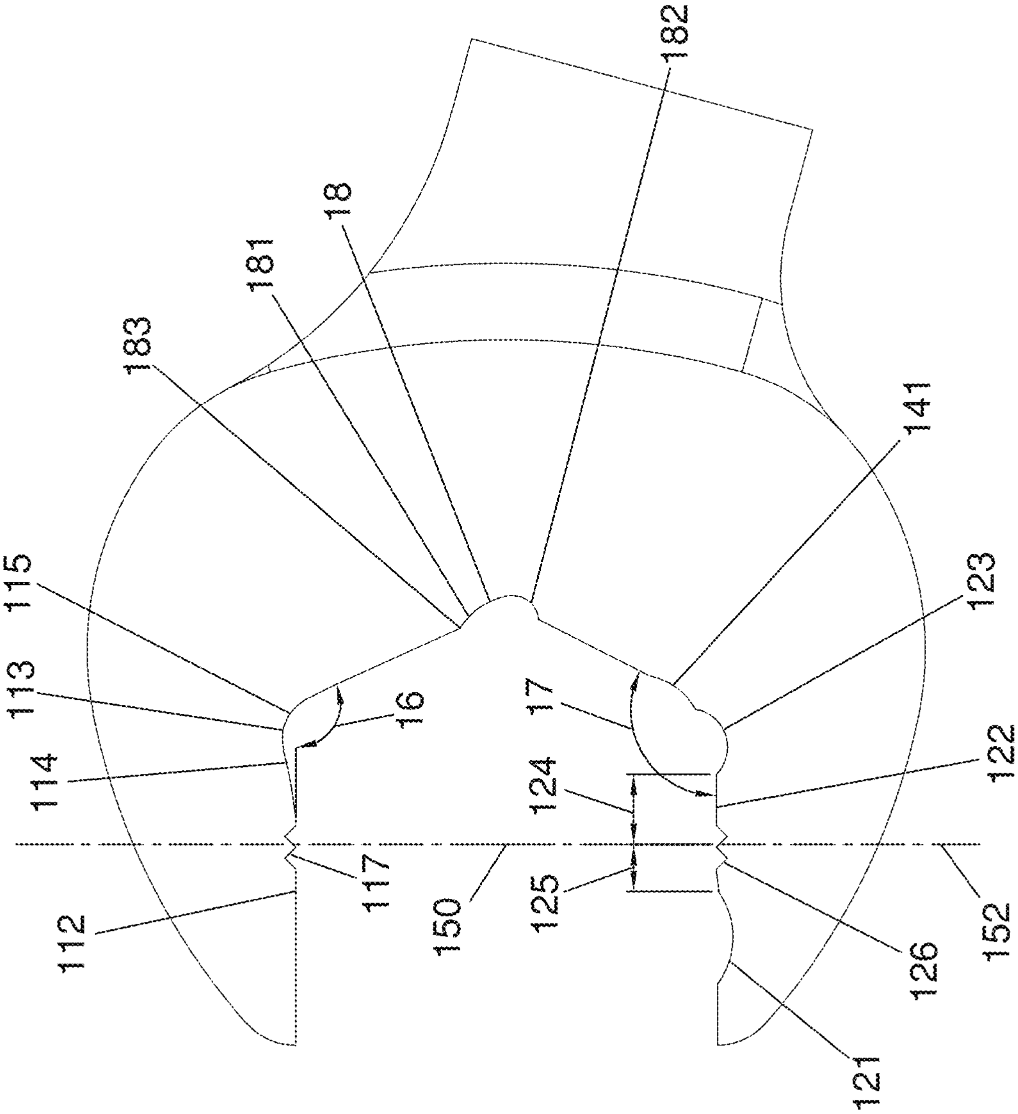
FIG. 7 is a top view of an engaging structure in accordance with the second preferred embodiment of the present invention.

Referring to FIG. 7 with reference to FIGS. 1-6, the first face 112 is provided with two first grooves 117. Each of the two first grooves 117 has a triangular shape. Each of the two first grooves 117 has an equilateral triangular shape. The two first grooves 117 are arranged linearly without an interval therebetween. The second face 122 is provided with two second grooves 126. The two second grooves 126 align with the two first grooves 117. Each of the two second grooves 126 has a triangular shape. Each of the two second grooves 126 has an equilateral triangular shape. The two second grooves 126 are arranged linearly without an interval therebetween. Each of the two second grooves 126 has a structure the same as that of each of the two first grooves 117.

Accordingly, the engaging structure of the present invention has the following advantages.

1. When the main body 10 is rotated clockwise to drive the screw member 20, the first face 112 of the main body 10 serves as the primary driving portion to drive and rotate one of the faces 21 of the screw member 20. The first face 112 of the main body 10 has a larger area and provides a better rotational torque to rotate the screw member 20 so that the first face 112 of the main body 10 will not form a bite mark on the faces 21 of the screw member 20.

2. When the main body 10 is rotated clockwise to drive the screw member 20, the first face 112, the second face 122, and the intersection point 183 press three of the six faces 21 of the screw member 20, so that the main body 10 has two faces and one point contacting the screw member 20 to facilitate the main body 10 driving the screw member 20.

3. When the main body 10 is rotated clockwise to drive the screw member 20, the first recess 113, the second recess 121, the third recess 123, and the fifth recess 18 align with four of the six sharp corners 22 of the screw member 20 to prevent the sharp corners 22 of the screw member 20 from being worn out. In such a manner, when the main body 10 drives and rotates the screw member 20, the main body 10 will not cause a bite mark on the six faces 21 of the screw member 20 and will not wear the six sharp corners 22 of the screw member 20.

4. When the main body 10 is rotated counterclockwise to unscrew and loosen the screw member 20, the first face 112, the second face 122, the intersection point 183, and the fourth side 14 press four of the six faces 21 of the screw member 20. At this time, the second face 122 of the main body 10 serves as the primary driving portion, while the first face 112, the intersection point 183, and the fourth side 14 serve as the secondary driving portion. Thus, the main body 10 has two faces and two points contacting the screw member 20 to facilitate the main body 10 driving the screw member 20.

5. In conclusion of the above-mentioned features, the main body 10 is provided with the first face 112, the first recess 113, the second face 122, the second recess 121, and the third recess 123. The first side 11 and the second side 12 have different structures to provide different functions when the main body 10 is rotated to operate the screw member 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An engaging structure comprising:
a main body;
the main body is an open wrench or an engaging portion of a hand tool;
the main body includes a first side, a second side, a third side, and a fourth side;
the first side is opposite to the second side;
the first side, the third side, the fourth side, and the second side are arranged serially and annularly;
the first side, the third side, the fourth side, and the second side of the main body are capable of contacting an inscribed hexagon;
the hexagon is an equilateral hexagon;
the hexagon has an axis;
the hexagon has six sides each of which has a first length;
a vertical line passes the axis in a two-dimensional plane;
the hexagon has a first line, a second line, a third line, a fourth line, a first angled corner, a second angled corner, and a third angled corner;
each of the first line, the second line, the third line, and the fourth line has a length equal to the first length;
the first line aligns with the first side, the second line aligns with the second side, the third line aligns with the third side, and the fourth line aligns with the fourth side;
the first side is provided with a first face and a first recess;
the vertical line passes the first face;
the first face has a planar shape;
the first face is arranged asymmetrically relative to the vertical line;
the first face extends to an opening of the main body;
the first recess connects the third side;
the first recess is provided with a first arcuate face and a second arcuate face;
the first arcuate face connects the first face;
the first arcuate face is tangent to the first face;
the first arcuate face is tangent to the second arcuate face;
the second arcuate face connects the third side;
the first arcuate face has a radius having an integer value equal to that of a distance between the first line and the second line;
if the integer value of the distance between the first line and the second line is 19 mm, the integer value of the radius of the first arcuate face is 19 mm;
if the integer value of the distance between the first line and the second line is 18 mm, the integer value of the radius of the first arcuate face is 18 mm;
the second side is provided with a second recess, a second face, and a third recess;
the second recess is a single arcuate face;
the vertical line passes the second face;
the second face faces the first face;
the second face has a planar shape;
the second face is arranged asymmetrically relative to the vertical line;
the third recess connects the fourth side;
the second face is arranged between the second recess and the third recess;
the third recess is a single arcuate face;
the third recess is not tangent to the second face;

the second recess has a radius more than that of the third recess;
the fourth side is provided with a fourth recess;
the fourth recess is close to the third recess;
the fourth recess is a single arcuate face;
the second recess has a radius more than that of the fourth recess;
the fourth recess has a radius more than that of the third recess;
a first angle is defined between the first side and the third side;
the first angle is less than 120 degrees;
a second angle is defined between the second side and the fourth side;
the second angle is less than 120 degrees;
the second angle is slightly more than the first angle;
a fifth recess is defined between the third side and the fourth side;
the fifth recess is arranged at a connection of the third side and the fourth side;
the fifth recess includes a third arcuate face, a fourth arcuate face, and an intersection point;
the third arcuate face connects the third side;
the fourth arcuate face connects the fourth side;
the third arcuate face is larger than the fourth arcuate face; and
the intersection point is arranged at a connection of the third arcuate face and the third side.

2. The engaging structure as claimed in claim 1, wherein:
the radius of the first arcuate face is more than that of the second arcuate face; and
the radius of the first arcuate face is seven times to nine times that of the second arcuate face.

3. The engaging structure as claimed in claim 1, wherein:
the first face is provided with two first grooves;
each of the two first grooves has a triangular shape;
each of the two first grooves has an equilateral triangular shape; and
the two first grooves are arranged linearly without an interval therebetween.

4. The engaging structure as claimed in claim 3, wherein:
the second face is provided with two second grooves;
the two second grooves align with the two first grooves;
each of the two second grooves has a triangular shape;
each of the two second grooves has an equilateral triangular shape;
the two second grooves are arranged linearly without an interval therebetween; and
each of the two second grooves has a structure the same as that of each of the two first grooves.

* * * * *